(12) United States Patent
Teraoka

(10) Patent No.: US 11,703,664 B2
(45) Date of Patent: Jul. 18, 2023

(54) CAMERA LENS

(71) Applicant: AAC Optics Solutions Pte. Ltd., Singapore (SG)

(72) Inventor: Hiroyuki Teraoka, Osaka (JP)

(73) Assignee: AAC Optics Solutions Pte. Ltd., Singapore (SG)

(*) Notice: Subject to any disclaimer, the term of this patent is extended or adjusted under 35 U.S.C. 154(b) by 358 days.

(21) Appl. No.: 17/094,827

(22) Filed: Nov. 11, 2020

(65) Prior Publication Data
US 2022/0128793 A1 Apr. 28, 2022

(30) Foreign Application Priority Data

Oct. 26, 2020 (JP) .............................. JP2020-178721

(51) Int. Cl.
  *G02B 9/62* (2006.01)
  *G02B 13/18* (2006.01)
(52) U.S. Cl.
  CPC .............. *G02B 9/62* (2013.01); *G02B 13/18* (2013.01)
(58) Field of Classification Search
  CPC ........... G02B 9/62; G02B 13/18; G02B 13/00
  See application file for complete search history.

(56) References Cited

U.S. PATENT DOCUMENTS

| 2016/0109688 A1* | 4/2016 | Jo ..................... G02B 13/0045 359/713 |
| 2016/0124191 A1* | 5/2016 | Hashimoto ........ G02B 13/0045 359/708 |
| 2020/0209546 A1* | 7/2020 | Zhao ........................ G02B 9/64 |
| 2020/0355891 A1* | 11/2020 | Ye .......................... G02B 13/04 |

FOREIGN PATENT DOCUMENTS

| CN | 110262005 A | * | 9/2019 | ......... G02B 13/0045 |
| CN | 110346911 A | * | 10/2019 | ......... G02B 13/0045 |

* cited by examiner

*Primary Examiner* — George G. King
*Assistant Examiner* — Anna Elizabeth Smith
(74) *Attorney, Agent, or Firm* — W&G Law Group

(57) ABSTRACT

The present invention provides a camera lens which is constituted by six lenses and has a narrow angle and good optical characteristics when shooting and a low height when retracted. The camera lens, includes, from an object side, a first lens having a positive refractive power; a second lens a having negative refractive power; a third lens having a positive refractive power; a fourth lens having a negative refractive power; a fifth lens having a negative refractive power; and a sixth lens having a positive refractive power, and satisfies given relational formulas.

4 Claims, 10 Drawing Sheets

CAMERA LENS

TECHNICAL FIELD

The present invention relates to a camera lens, and in particular, to a camera lens suitable for portable module cameras, digital cameras, etc., which use CCD, CMOS and other imaging elements for high pixels. The camera lens is constituted by six lenses, and has a narrow full-field view angle (hereinafter referred to as 2ω) that is 52° or less with good optical characteristics when shooting, and a low height with TTL/IH being 1.60 or smaller when retracted.

BACKGROUND

With angle narrowing of a camera lens, a total length of the lenses (TTL) of the camera lens become longer. Therefore, in recent years, a camera lens having a narrow angle and good optical characteristics when shooting, and a low height after the lens barrel is retracted into the camera when not shooting to shorten the TTL, has been desired.

Technical development related to a camera lens including six lenses and having a narrow angle and good optical characteristics is progressing. As a camera lens including 6 lenses, the camera lens has a first lens having a positive refractive power, a second lens having a negative refractive power, a third lens having a positive refractive power, a fourth lens having a negative refractive power, a fifth lens having a negative refractive power, and a sixth lens having a positive refractive power, sequentially arranged from an object side.

Regarding the camera lens, although 2ω is narrowed to 47.0°-47.2°, a ratio of an on-axis distance between an object side surface of the first lens and an image side surface of the sixth lens to the TTL during shooting is insufficient, resulting in an insufficient low height when retracted.

SUMMARY

An object of the present invention is to provide a camera lens which is constituted by six lenses and has a narrow angle and good optical characteristics when shooting, and a low height when retracted.

In order to achieve the object described above, a ratio of an on-axis distance between an object side surface of a first lens and an image side surface of a sixth lens to TTL when shooting, a ratio of a focal length of the first lens to a focal length of the second lens, a ratio of a curvature radius of an object side surface of a fifth lens to a focal length of the camera lens, a ratio of a center thickness of the first lens to the focal length of the camera lens, a ratio of an on-axis distance between an image side surface of a fourth lens and an object side surface of the fifth lens to the focal length of the camera lens have been intensively discussed, thereby obtaining the camera lens which solves the problem exiting in the prior art, and thus accomplishing the present invention.

Technical Solution 1 provides a camera lens including, from an object side: a first lens having a positive refractive power; a second lens having a negative refractive power; a third lens having positive refractive power; a fourth lens having a negative refractive power; a fifth lens having a negative refractive power; and a sixth lens having a positive refractive power, and satisfies relational formulas (1)-(5):

$$DL/TTL \text{ when shooting} \leq 0.60 \tag{1}$$

$$-1.00 \leq f1/f2 \leq -0.80 \tag{2}$$

$$-0.55 \leq R9/f \leq -0.15 \tag{3}$$

$$0.07 \leq d1/f \leq 0.11 \tag{4}$$

$$0.11 \leq d8/f \leq 0.15 \tag{5}$$

where DL represents an on-axis distance from an object side surface of the first lens to an image side surface of the sixth lens, TTL when shooting represents a total length of the camera lens when shooting, i.e., an on-axis distance from the object side surface of the first lens to an image surface, f represents a focal length of the camera lens, f1 represents a focal length of the first lens, f2 represents a focal length of the second lens, R9 represents a curvature radius of an object side surface of the fifth lens, d1 represents a center thickness of the first lens; and d8 represents an on-axis distance from an image side surface of the fourth lens to the object side surface of the fifth lens.

Technical solution 2 proposes a camera lens based on Technical solution 1, and further satisfying a relational formula (6):

$$0.50 \leq f1/f \leq 0.80 \tag{6}$$

Technical solution 3 proposes a camera lens based on Technical solution 1, and further satisfying a relational formula (7):

$$-1.00 \leq f2/f \leq -0.50 \tag{7}$$

Technical solution 4 proposes a camera lens based on Technical solution 1 and further satisfying a relational formula (8):

$$0.59 \leq f3/f \leq 0.90 \tag{8}$$

where f3 represents a focal length of the third lens.

Technical solution 5 proposes a camera lens based on Technical solution 1 and further satisfying a relational formula (9):

$$0.06 \leq d5/f \leq 0.10 \tag{9}$$

where d5 represents a center thickness of the third lens.

The camera lens particularly provided by the present invention is suitable for portable module cameras, digital cameras, etc., which use CCD, CMOS and other imaging elements for high pixels. The camera lens includes six lenses and has a narrow angle with 2ω<52° and good optical characteristics when shooting, and a low height with TTL/IH<1.60 when retracted.

DESCRIPTION OF EMBODIMENTS

Figure 1:
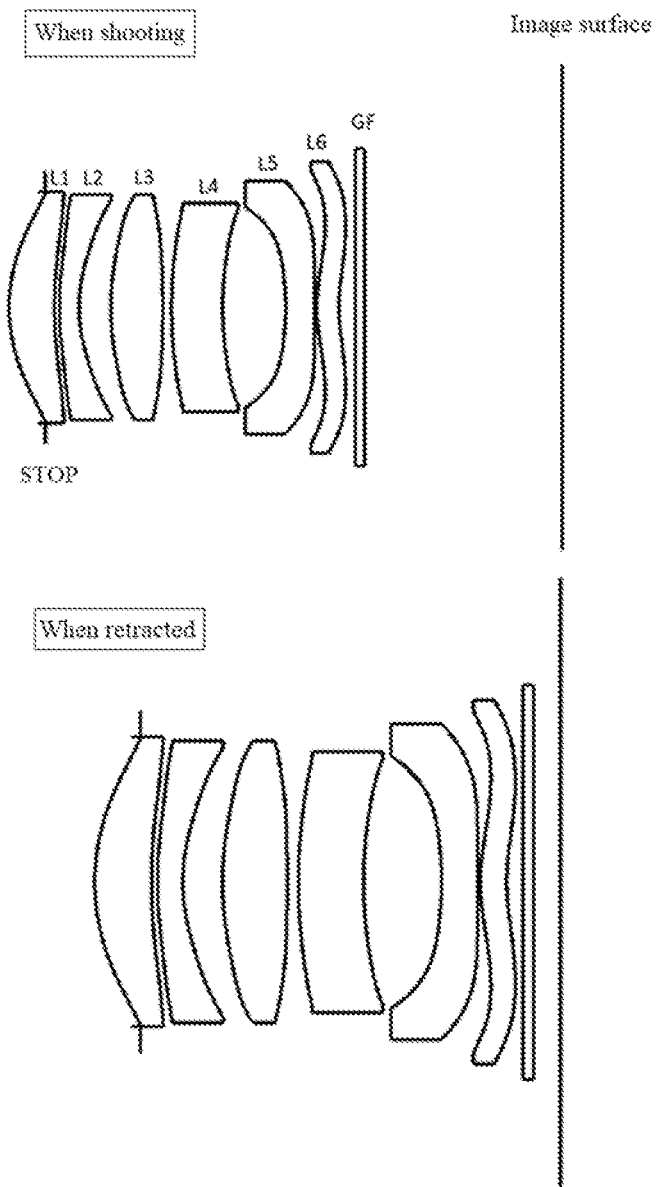
FIG. 1 is a diagram illustrating a schematic configuration of a camera lens LA of Embodiment 1 of the present invention.

An implementation manner of a camera lens according to the present invention will be described. The camera lens LA includes a lens system, and the lens system is a six-lens structure including, from an object side to an image side, a first lens L1, a second lens L2, a third lens L3, a fourth lens L4, a fifth lens L5, and a sixth lens L6. A glass plate GF is provided between the sixth lens L6 and an image surface. Cover glasses, various filters, etc. are available as the glass plate GF. In the present invention, the glass plate GF can be arranged in different positions, or can be omitted.

The first lens L1 is a lens having a positive refractive power, the second lens L2 is a lens having a negative refractive power, the third lens L3 is a lens having a positive refractive power, the fourth lens L4 is a lens having a negative refractive power, the fifth lens L5 is a lens having a negative refractive power, and the sixth lens L6 is a lens having a positive refractive power. Regarding surfaces of these six lenses, in order to correct various aberrations satisfactorily, it is desired to set each of these surfaces as an aspheric shape.

The camera lens LA satisfies the following relational formula (1):

$$DL/TL \text{ when shooting} \leq 0.60 \quad (1)$$

The relational formula (1) defines a ratio of an on-axis distance between an object side surface S1 of the first lens L1 to an image side surface S12 of the sixth lens L6 to TTL when shooting. By setting it within a range of the relational formula (1), a low height when retracted is easy, therefore being preferable.

The camera lens LA further satisfies the following relational formula (2):

$$-1.00 \leq f1/f2 \leq -0.80 \quad (2)$$

The relational formula (2) defines a ratio of a focal length f1 of the first lens L1 to a focal length f2 of the second lens L2. By setting it within a range of the relational formula (2), correction of on-axis and off-axis chromatic aberrations under a narrow angle is easy, thereby being preferable.

The camera lens LA further satisfies the following relational formula (3):

$$-0.55 \leq R9/f \leq -0.15 \quad (3)$$

The relational formula (3) defines a ratio of a curvature radius R9 of an object side surface S9 of the fifth lens L5 to the focal length f of the entire camera lens LA. By setting it within a range of the relational formula (3), correction of various aberrations under the low height when retracted and under the narrow angle when shooting is easy, thereby being preferable.

The camera lens LA further satisfies the following relational formula (4):

$$0.07 \leq d1/f \leq 0.11 \quad (4)$$

The relational formula (4) defines a ratio of a center thickness d1 of the first lens L1 to the focal length f of the entire camera lens LA. By setting it within a range of the relational formula (4), correction of various aberrations under the low height when retracted and under the narrow angle when shooting is easy, thereby being preferable.

The camera lens LA further satisfies the following relational formula (5):

$$0.11 \leq d8/f \leq 0.15 \quad (5)$$

The relational formula (5) defines a ratio of an on-axis distance d8 between an image side surface S8 of the fourth lens L4 and an object side surface S9 of the fifth lens L5 to the focal length f of the entire camera lens LA. By setting it within a range of the relational formula (5), correction of various aberrations under the low height when retracted and under the narrow angle when shooting is easy, thereby being preferable.

The camera lens LA further satisfies the following relational formula (6):

$$0.50 \leq f1/f \leq 0.80 \quad (6)$$

The relational formula (6) defines the positive refractive power of the first lens L1 as a ratio of a focal length f1 of the first lens L1 to the focal length f of the entire camera lens LA. By setting it within a range of the relational formula (6), correction of various aberrations under the low height when retracted and under the narrow angle when shooting is easy, thereby being preferable.

The camera lens LA further satisfies the following relational formula (7):

$$-1.00 \leq f2/f \leq -0.50 \quad (7)$$

The relational formula (7) defines the negative refractive power of the second lens L2 as a ratio of a focal length f2 of the second lens L2 to the focal length f of the entire camera lens LA. By setting it within a range of the relational formula (7), correction of various aberrations under the low height when being retracted and under the narrow angle when shooting is easy, thereby being preferable.

The camera lens LA further satisfies the following relational formula (8):

$$0.59 \leq f3/f \leq 0.90 \quad (8)$$

The relational formula (8) defines the positive refractive power of the third lens L3 as a ratio of a focal length f3 of the third lens L3 to the focal length f of the entire camera lens LA. By setting it in the range of the relational formula (8), correction of various aberrations under the low height when being retracted and under the narrow angle when shooting is easy, thereby being preferable.

The camera lens LA further satisfies the following relational formula (9):

$$0.06 \leq d5/f \leq 0.10 \quad (9)$$

The relational formula (9) defines a ratio of a center thickness d5 of the third lens L3 to the focal length f of the entire camera lens LA. By setting it within a range of the relational formula (9), correction of various aberrations under the low height when being retracted and under the narrow angle when shooting is easy, thereby being preferable.

By making the six lenses constituting the camera lens LA satisfy the above configuration and relational formulas, it is possible to obtain a camera lens which is constituted by six lenses and has a narrow angle with 2ω<52° and good optical characteristics when shooting, and a low height with TTL/IH<1.60 when retracted.

EMBODIMENTS

Hereinafter, embodiments are provided for illustrating the camera lens LA of the present invention. The reference numerals described in the embodiments are listed below. In addition, the distance, the radius, and the center thickness have a unit of mm.
 f: focal length of an entire camera lens LA
 f1: focal length of a first lens L1
 f2: focal length of a second lens L2
 f3: focal length of a third lens L3
 f4: focal length of a fourth lens L4
 f5: focal length of a fifth lens L5
 f6: focal length of a sixth lens L6
 Fno: F-number
 2ω: full-field view angle
 STOP: aperture
 R: curvature radius of an optical surface, center curvature radius in a case of a lens
 R1: curvature radius of an object side surface S1 of the first lens L1
 R2: curvature radius of an image side surface S2 of the first lens L1
 R3: curvature radius of an object side surface S3 of the second lens L2
 R4: curvature radius of an image side surface S4 of the second lens L2
 R5: curvature radius of an object side surface S5 of the third lens L3
 R6: curvature radius of an image side surface S6 of the third lens L3
 R7: curvature radius of an object side surface S7 of the fourth lens L4
 R8: curvature radius of an image side surface S8 of the fourth lens L4
 R9: curvature radius of an object side surface S9 of the fifth lens L5
 R10: curvature radius of an image side surface S10 of the fifth lens L5
 R11: curvature radius of an object side surface S11 of the sixth lens L6
 R12: curvature radius of an image side surface S12 of the sixth lens L6
 R13: curvature radius of an object side surface S13 of a glass plate GF
 R14: curvature radius of an image side surface S14 of the glass plate GF
 d: center thickness of a lens or a distance between lenses
 d0: on-axis distance from the object side surface S1 of the first lens L1 to the aperture STOP
 d1: center thickness of the first lens L1
 d2: on-axis distance from the image side surface S2 of the first lens L1 to the object side surface S3 of the second lens L2
 d3: center thickness of the second lens L2
 d4: on-axis distance from the image side surface S4 of the second lens L2 to the object side surface S5 of the third lens L3
 d5: center thickness of the third lens L3
 d6: on-axis distance from the image side surface S6 of the third lens L3 to the object side surface S7 of the fourth lens L4
 d7: center thickness of the fourth lens L4
 d8: on-axis distance from the image side surface S8 of the fourth lens L4 to the object side surface S9 of the fifth lens L5
 d9: center thickness of the fifth lens L5
 d10: on-axis distance from the image side surface S10 of the fifth lens L5 to the object side surface S11 of the sixth lens L6
 d11: center thickness of the sixth lens L6
 d12: on-axis distance from the image side surface S12 of the sixth lens L6 to the object side surface S13 of the glass plate GF
 d13: center thickness of the glass plate GF
 d14: on-axis distance from the image side surface S14 of the glass plate GF to an image surface
 DL: on-axis distance from the object side surface S1 of the first lens L1 to the image side surface S12 of the sixth lens L6
 IH: maximum image height
 nd: refractive index of d line
 nd1: refractive index of d line of the first lens L1
 nd2: refractive index of d line of the second lens L2
 nd3: refractive index of d line of the third lens L3
 nd4: refractive index of d line of the fourth lens L4
 nd5: refractive index of d line of the fifth lens L5
 nd6: refractive index of d line of the sixth lens L6
 ndg: refractive index of d line of the glass plate GF
 ν: Abbe number
 ν1: Abbe number of the first lens L1
 ν2: Abbe number of the second lens L2
 ν3: Abbe number of the third lens L3
 ν4: Abbe number of the fourth lens L4
 ν5: Abbe number of the fifth lens L5
 ν6: Abbe number of the sixth lens L6
 νg: Abbe number of the glass plate GF
 TTL: total length of the camera lens (on-axis distance from the object side surface S1 of the first lens L1 to the image surface)

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (10)$$

For convenience, an aspheric surface of each lens surface uses an aspheric surface illustrated by formula (10). However, the present invention is not limited to the aspheric polynomial of formula (10).

Embodiment 1

FIG. 1 is a diagram illustrating a schematic configuration of a camera lens LA of Embodiment 1 of the present invention when shooting and when retracted. For each of the first lens L1 to the sixth lens L6 constituting the camera lens LA of Embodiment 1, the curvature radius R of the object side and the image side, the center thickness of the lens or the distance d between the lenses, the refractive index nd, and the Abbe number ν are as shown in Table 1; a value of A when shooting and a value of A when retracted are as shown in Table 2; a cone coefficient k and an aspheric coefficient are as shown in Table 3; and 2ω, Fno, f, f1, f2, f3, f4, f5, f6, TTL, and IH are as shown in Table 4.

|  |  | R | d |  | nd |  | vd | Effective radius(mm) |
| --- | --- | --- | --- | --- | --- | --- | --- | --- |
| STOP |  | ∞ | d0= | −0.853 |  |  |  | 2.673 |
| S1 | R1 | 3.82379 | d1= | 1.067 | nd1 1.5438 | v1 | 56.03 | 2.674 |
| S2 | R2 | 16.89898 | d2= | 0.111 |  |  |  | 2.627 |
| S3 | R3 | 10.26802 | d3= | 0.476 | nd2 1.6153 | v2 | 56.03 | 2.607 |
| S4 | R4 | 3.51422 | d4= | 0.747 |  |  |  | 2.507 |
| S5 | R5 | 6.72053 | d5= | 1.219 | nd3 1.5438 | v3 | 56.03 | 2.594 |
| S6 | R6 | −10.16391 | d6= | 0.207 |  |  |  | 2.545 |
| S7 | R7 | 20.58858 | d7= | 1.200 | nd4 1.6700 | v4 | 19.39 | 2.406 |
| S8 | R8 | 8.27406 | d8= | 1.475 |  |  |  | 2.265 |
| S9 | R9 | −5.49035 | d9= | 0.680 | nd5 1.5346 | v5 | 1.53 | 2.318 |
| S10 | R10 | −22.82994 | d10= | 0.050 |  |  |  | 2.918 |
| S11 | R11 | 3.38014 | d11= | 0.491 | nd6 1.6610 | v6 | 20.53 | 3.181 |
| S12 | R12 | 3.59973 | d12= | 0.390 |  |  |  | 3.356 |
| S13 | R13 | ∞ | d13= | 0.210 | ndg 1.5168 | vg | 64.17 | 3.612 |
| S14 | R14 | ∞ | d14= | A |  |  |  | 3.667 |

Reference wavelength = 588 nm

TABLE 2

|  | When shooting | When retracted |
| --- | --- | --- |
| A | 4.657 | 0.500 |

TABLE 3

| Cone coefficient | Aspheric coefficient |  |  |  |  |
| --- | --- | --- | --- | --- | --- |
| k | A4 | A6 | A8 | A10 | A12 |

|  | k | A4 | A6 | A8 | A10 | A12 |
| --- | --- | --- | --- | --- | --- | --- |
| S1 | 0.0000E+00 | −1.1324E−03 | 1.5446E−03 | −2.4903E−03 | 1.6116E−03 | −5.8010E−04 |
| S2 | 0.0000E+00 | 6.0832E−02 | −7.9941E−02 | 5.5375E−02 | −2.2921E−02 | 5.9065E−03 |
| S3 | 0.0000E+00 | 7.2229E−02 | −1.0828E−0 1 | 7.7489E−02 | −3.3303E−02 | 9.0586E−03 |
| S4 | 0.0000E+00 | 2.8248E−02 | −5.6385E−02 | 4.1955E−02 | −1.9616E−02 | 6.0206E−03 |
| S5 | 0.0000E+00 | 1.9104E−02 | −1.6924E−02 | 8.1799E−03 | −3.3333E−03 | 1.0203E−03 |
| S6 | 0.0000E+00 | 6.0107E−02 | −4.8310E−02 | 2.1133E−02 | −6.4598E−03 | 1.4934E−03 |
| S7 | 0.0000E+00 | 4.7226E−02 | −3.9388E−02 | 1.9047E−02 | −6.5142E−03 | 1.7344E−03 |
| S8 | 0.0000E+00 | 7.3324E−03 | −7.5437E−03 | 4.0045E−03 | −1.6875E−03 | 6.5480E−04 |
| S9 | 0.0000E+00 | 3.1318E−02 | −2.5635E−02 | 6.8241E−03 | −5.0533E−04 | −4.6860E−04 |
| S10 | 0.0000E+00 | 2.3484E−02 | −1.0183E−02 | −9.9411E−04 | 1.4480E−03 | −4.2861E−04 |
| S11 | 0.0000E+00 | −5.9399E−02 | 2.2464E−02 | −8.8614E−03 | 2.4186E−03 | −4.3080E−04 |
| S12 | 0.0000E+00 | −6.0357E−02 | 2.0661E−02 | −6.6294E−03 | 1.5247E−03 | −2.3906E−04 |

| Cone coefficient | Aspheric coefficient |  |  |  |  |
| --- | --- | --- | --- | --- | --- |
| k | A14 | A16 | A18 | A20 | / |

|  | k | A14 | A16 | A18 | A20 | / |
| --- | --- | --- | --- | --- | --- | --- |
| S1 | 0.0000E+00 | 1.2239E−04 | −1.5190E−05 | 1.0285E−06 | −2.9282E−08 | / |
| S2 | 0.0000E+00 | −9.5503E−04 | 9.3945E−05 | −5.1143E−06 | 1.1741E−07 | / |
| S3 | 0.0000E+00 | −1.5658E−03 | 1.6643E−04 | −9.9044E−06 | 2.5213E−07 | / |
| S4 | 0.0000E+00 | −1.1929E−03 | 1.4614E−04 | −1.0049E−05 | 2.9625E−07 | / |
| S5 | 0.0000E+00 | −1.9929E−04 | 2.3009E−05 | −1.4195E−06 | 3.5515E−08 | / |
| S6 | 0.0000E+00 | −2.5076E−04 | 2.7628E−05 | −1.7307E−06 | 4.5737E−08 | / |
| S7 | 0.0000E+00 | −3.4288E−04 | 4.4828E−05 | −3.3582E−06 | 1.0767E−07 | / |
| S8 | 0.0000E+00 | −1.8697E−04 | 3.3433E−05 | −3.3491E−06 | 1.4604E−07 | / |
| S9 | 0.0000E+00 | 2.3422E−04 | −5.2863E−05 | 5.9810E−06 | −2.6934E−07 | / |
| S10 | 0.0000E+00 | 6.7040E−05 | −6.1958E−06 | 3.2801E−07 | −7.8299E−09 | / |
| S11 | 0.0000E+00 | 4.9033E−05 | −3.4808E−06 | 1.4268E−07 | −2.6220E−09 | / |
| S12 | 0.0000E+00 | 2.4701E−05 | −1.6149E−06 | 6.0835E−08 | −1.0109E−09 | / |

TABLE 4

| 2ω (°) | 46.46 |
| --- | --- |
| Fno | 2.40 |
| f (mm) | 12.829 |
| f1 (mm) | 8.834 |
| f2 (mm) | −8.923 |
| f3 (mm) | 7.633 |
| f4 (mm) | −21.485 |
| f5 (mm) | −13.709 |
| f6 (mm) | 44.370 |
| TTL when shooting (mm) | 12.980 |

TABLE 4-continued

| TTL when retracted (mm) | 8.823 |
| --- | --- |
| IH (mm) | 5.600 |
| TTL when shooting/IH | 2.318 |
| TTL when retracted/IH | 1.576 |

Table 21 described later shows the values corresponding to the parameters defined by the relational formulas (1) to (9) of Embodiment 1 to Embodiment 5.

Embodiment 1 is as shown in Table 21, and satisfies the relational formulas (1) to (9).

Figure 2:
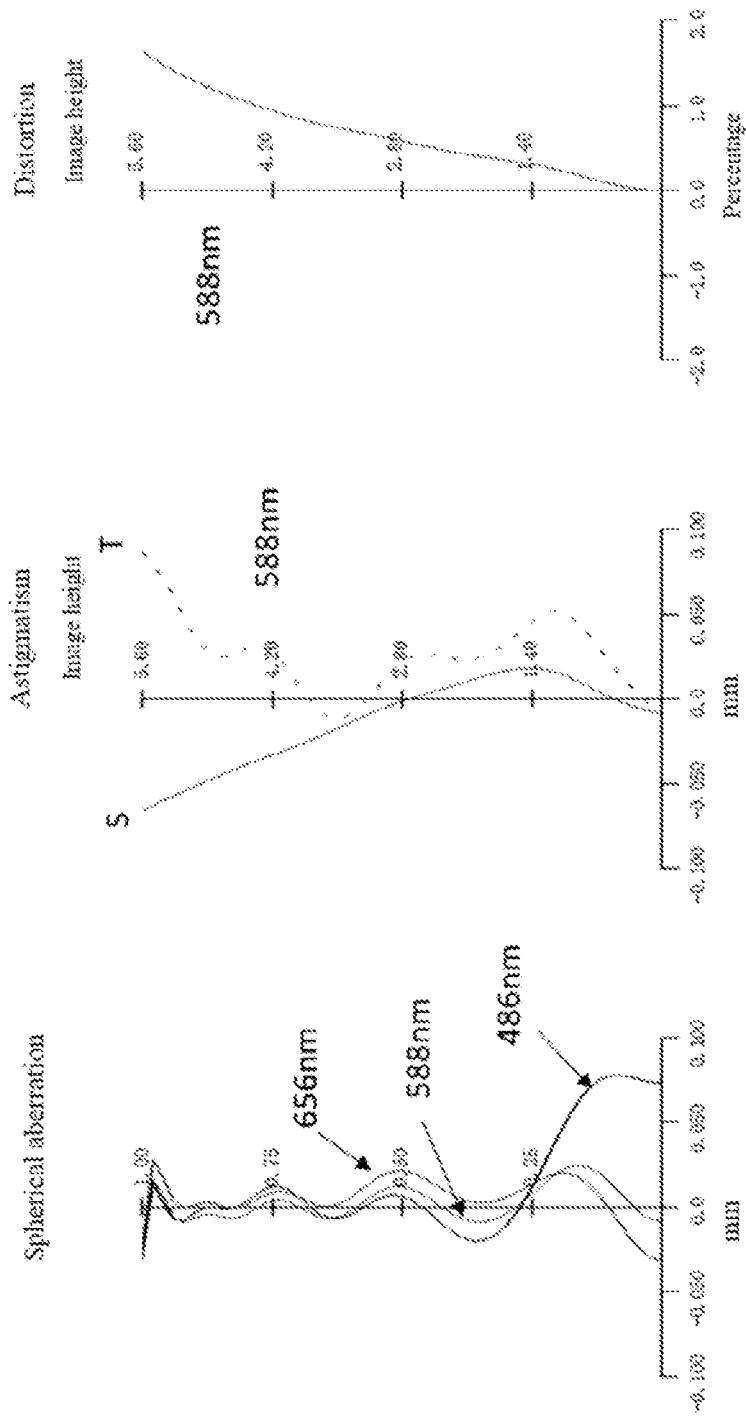
FIG. 2 is a diagram illustrating spherical aberration, astigmatism, and distortion of the camera lens LA of Embodiment 1 of the present invention.

The spherical aberration, astigmatism, and distortion of the camera lens LA of Embodiment 1 are as shown in FIG. 2. In addition, among the field curves in the figure, S is the field curve of a sagittal image surface, and T is the field curve of a meridional image surface, which also applies to Embodiment 2 to Embodiment 5. The camera lens LA of Embodiment 1 is as shown in FIG. 2, then it is known that $2\omega=46.46°$, and the camera lens has a low height with TTL/IH=1.576 when retracted and has good optical characteristics.

Embodiment 2

Figure 3:
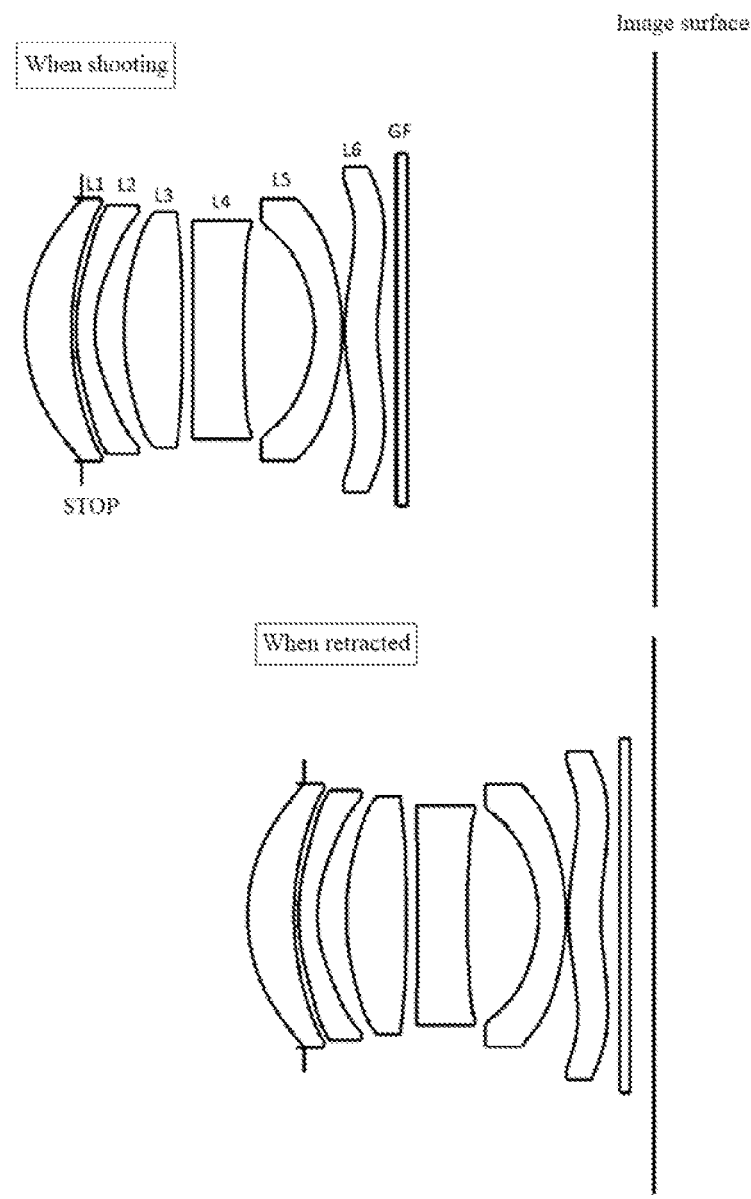
FIG. 3 is a diagram illustrating a schematic configuration of a camera lens LA of Embodiment 2 of the present invention.

FIG. 3 is a diagram illustrating a schematic configuration of a camera lens LA of Embodiment 2 of the present invention when shooting and when retracted. For each of the first lens L1 to the sixth lens L6 constituting the camera lens LA of Embodiment 2, the curvature radius R of the object side and the image side, the center thickness of the lens or the distance d between the lenses, the refractive index nd, and the Abbe number ν are as shown in Table 5; a value of A when shooting and a value of A when retracted are as shown in Table 6; a cone coefficient k and an aspheric coefficient are as shown in Table 7; and 2ω, Fno, f, f1, f2, f3, f4, f5, f6, TTL, and IH are as shown in Table 8.

TABLE 5

| | | R | d | | nd | | νd | Effective radium (mm) |
|---|---|---|---|---|---|---|---|---|
| STOP | | ∞ | d0= | −1.161 | | | | 2.661 |
| S1 | R1 | 3.36468 | d1= | 0.958 | nd1 | 1.5438 | ν1 56.03 | 2.661 |
| S2 | R2 | 7.74915 | d2= | 0.092 | | | | 2.530 |
| S3 | R3 | 5.00514 | d3= | 0.388 | nd2 | 1.6153 | ν2 25.94 | 2.519 |
| S4 | R4 | 2.95304 | d4= | 0.601 | | | | 2.369 |
| S5 | R5 | 6.32128 | d5= | 1.213 | nd3 | 1.5438 | ν3 56.03 | 2.390 |
| S6 | R6 | −17.81805 | d6= | 0.222 | | | | 2.291 |
| S7 | R7 | −639.82239 | d7= | 1.030 | nd4 | 1.6700 | ν4 19.39 | 2.212 |
| S8 | R8 | 14.55758 | d8= | 1.471 | | | | 2.092 |
| S9 | R9 | −2.30661 | d9= | 0.577 | nd5 | 1.5346 | ν5 55.69 | 2.197 |
| S10 | R10 | −3.26597 | d10= | 0.050 | | | | 2.648 |
| S11 | R11 | 4.30016 | d11= | 0.667 | nd6 | 1.6610 | ν6 20.53 | 3.085 |
| S12 | R12 | 4.72203 | d12= | 0.390 | | | | 3.304 |
| S13 | R13 | ∞ | d13= | 0.210 | ndg | 1.5168 | νg 64.17 | 3.525 |
| S14 | R14 | ∞ | d14= | A | | | | 3.576 |

Reference wavelength = 588 nm

TABLE 6

| | When shooting | When retracted |
|---|---|---|
| A | 5.111 | 0.500 |

TABLE 7

| | Cone coefficient | Aspheric coefficient | | | | |
|---|---|---|---|---|---|---|
| | k | A4 | A6 | A8 | A10 | A12 |
| S1 | 0.0000E+00 | −9.4163E−04 | 1.4316E−03 | −1.9706E−03 | 1.2814E−03 | −4.6318E−04 |
| S2 | 0.0000E+00 | 6.3008E−02 | −8.0091E−02 | 5.6740E−02 | −2.4174E−02 | 6.4593E−03 |
| S3 | 0.0000E+00 | 8.3279E−02 | −1.1279E−0 1 | 7.7148E−02 | −3.3148E−02 | 9.1924E−03 |
| S4 | 0.0000E+00 | 4.4637E−02 | −6.1465E−02 | 3.8524E−02 | −1.7432E−02 | 5.5469E−03 |
| S5 | 0.0000E+00 | 2.4334E−02 | −1.3193E−02 | 4.9458E−03 | −1.9604E−03 | 5.0009E−04 |
| S6 | 0.0000E+00 | 3.1490E−02 | −2.5548E−02 | 1.2702E−02 | −5.7396E−03 | 2.0985E−03 |
| S7 | 0.0000E+00 | 1.7408E−02 | −2.3880E−02 | 1.6573E−02 | −9.0935E−03 | 3.8130E−03 |
| S8 | 0.0000E+00 | −5.0747E−04 | −1.0860E−02 | 1.4094E−02 | −1.1440E−02 | 6.2355E−03 |
| S9 | 0.0000E+00 | 5.1915E−02 | −1.5940E−02 | −4.6846E−03 | 7.7846E−03 | −3.9407E−03 |
| S10 | 0.0000E+00 | 4.6615E−02 | −1.7028E−02 | 2.1051E−03 | 1.4101E−03 | −8.9514E−04 |
| S11 | 0.0000E+00 | −3.1250E−02 | 6.7784E−03 | −1.8808E−03 | 5.2698E−04 | −1.2792E−04 |
| S12 | 0.0000E+00 | −3.9081E−02 | 1.3034E−02 | −4.5146E−03 | 1.2011E−03 | −2.2692E−04 |

| | Cone coefficient | Aspheric coefficient | | | |
|---|---|---|---|---|---|
| | k | A14 | A16 | A18 | A20 | / |
| S1 | 0.0000E+00 | 9.8333E−05 | −1.2353E−05 | 8.4736E−07 | −2.4226E−08 | / |
| S2 | 0.0000E+00 | −1.0916E−03 | 1.1316E−04 | −6.5507E−06 | 1.6211E−07 | / |
| S3 | 0.0000E+00 | −1.6303E−03 | 1.7813E−04 | −1.0891E−05 | 2.8385E−07 | / |
| S4 | 0.0000E+00 | −1.1760E−03 | 1.5892E−04 | −1.2462E−05 | 4.3036E−07 | / |
| S5 | 0.0000E+00 | −4.3402E−05 | −5.6110E−06 | 1.3933E−06 | −7.9861E−08 | / |
| S6 | 0.0000E+00 | −5.0947E−04 | 7.5063E−05 | −6.1092E−06 | 2.1076E−07 | / |

TABLE 7-continued

| | | | | | | |
|---|---|---|---|---|---|---|
| S7 | 0.0000E+00 | −1.0650E−03 | 1.8241E−04 | −1.7352E−05 | 7.0163E−07 | / |
| S8 | 0.0000E+00 | −2.1905E−03 | 4.7519E−04 | −5.8005E−05 | 3.0617E−06 | / |
| S9 | 0.0000E+00 | 1.0677E−03 | −1.5806E−04 | 1.0891E−05 | −1.4874E−07 | / |
| S10 | 0.0000E+00 | 2.4075E−04 | −3.5528E−05 | 2.8119E−06 | −9.3441E−08 | / |
| S11 | 0.0000E+00 | 2.1137E−05 | −2.1482E−06 | 1.2224E−07 | −2.9872E−09 | / |
| S12 | 0.0000E+00 | 2.8587E−05 | −2.2625E−06 | 1.0151E−07 | −1.9644E−09 | / |

TABLE 8

| | |
|---|---|
| 2ω (°) | 46.60 |
| Fno | 2.40 |
| f (mm) | 12.772 |
| f1 (mm) | 10.154 |
| f2 (mm) | −12.614 |
| f3 (mm) | 8.735 |
| f4 (mm) | −21.229 |
| f5 (mm) | −18.579 |
| f6 (mm) | 44.684 |
| TTL when shooting (mm) | 12.980 |
| TTL when retracted (mm) | 8.369 |
| IH (mm) | 5.600 |
| TTL when shooting/IH | 2.318 |
| TTL when retracted/IH | 1.494 |

Embodiment 2 is as shown in Table 21, and satisfies the relational formulas (1) to (9).

Figure 4:
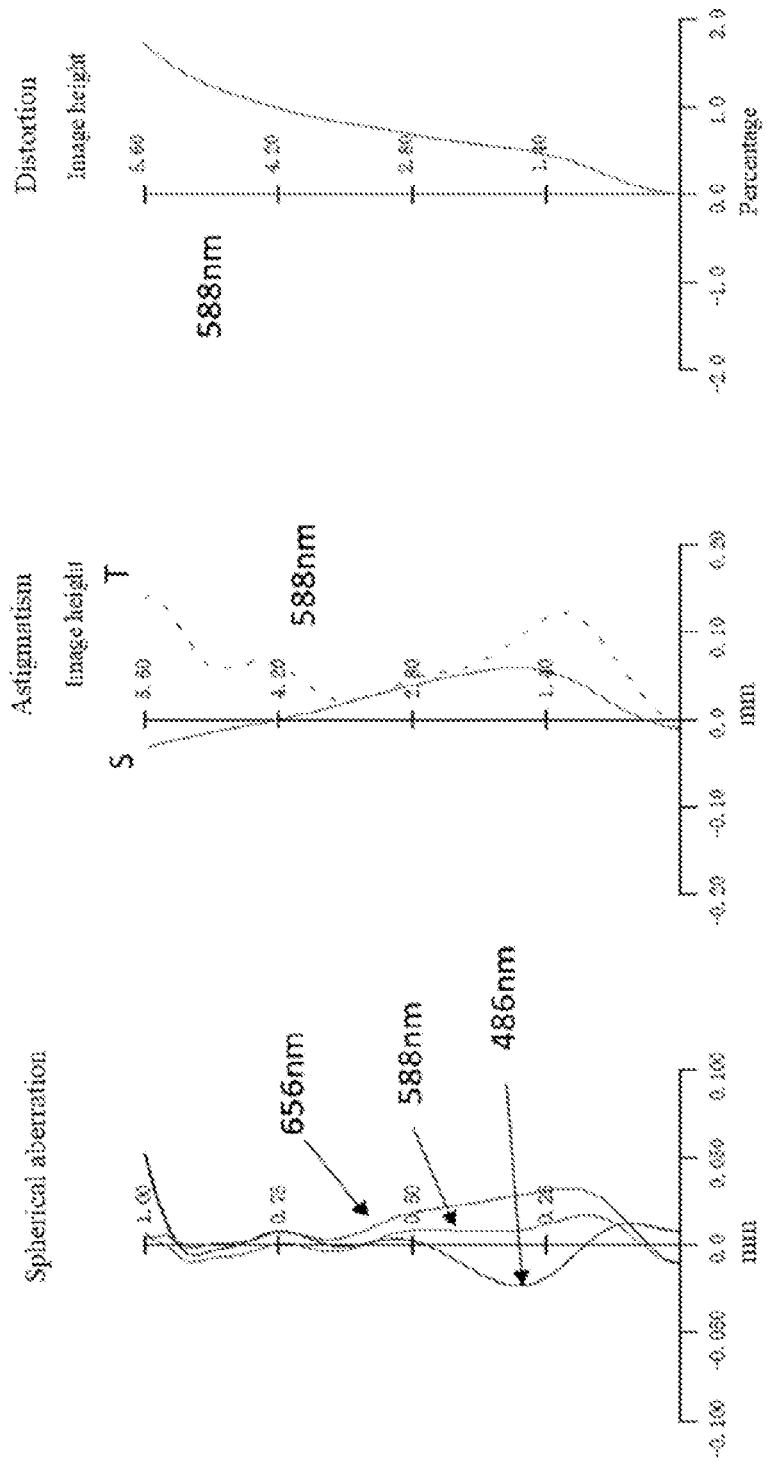
FIG. 4 is a diagram illustrating spherical aberration, astigmatism, and distortion of the camera lens LA of Embodiment 2 of the present invention.

The spherical aberration, astigmatism, and distortion of the camera lens LA of Embodiment 2 are as shown in FIG. 4. The camera lens LA of Embodiment 2 is as shown in FIG. 4, then it is known that $2\omega=46.60°$, and the camera lens has a low height with TTL/IH=1.494 when retracted and has good optical characteristics.

Embodiment 3

Figure 5:
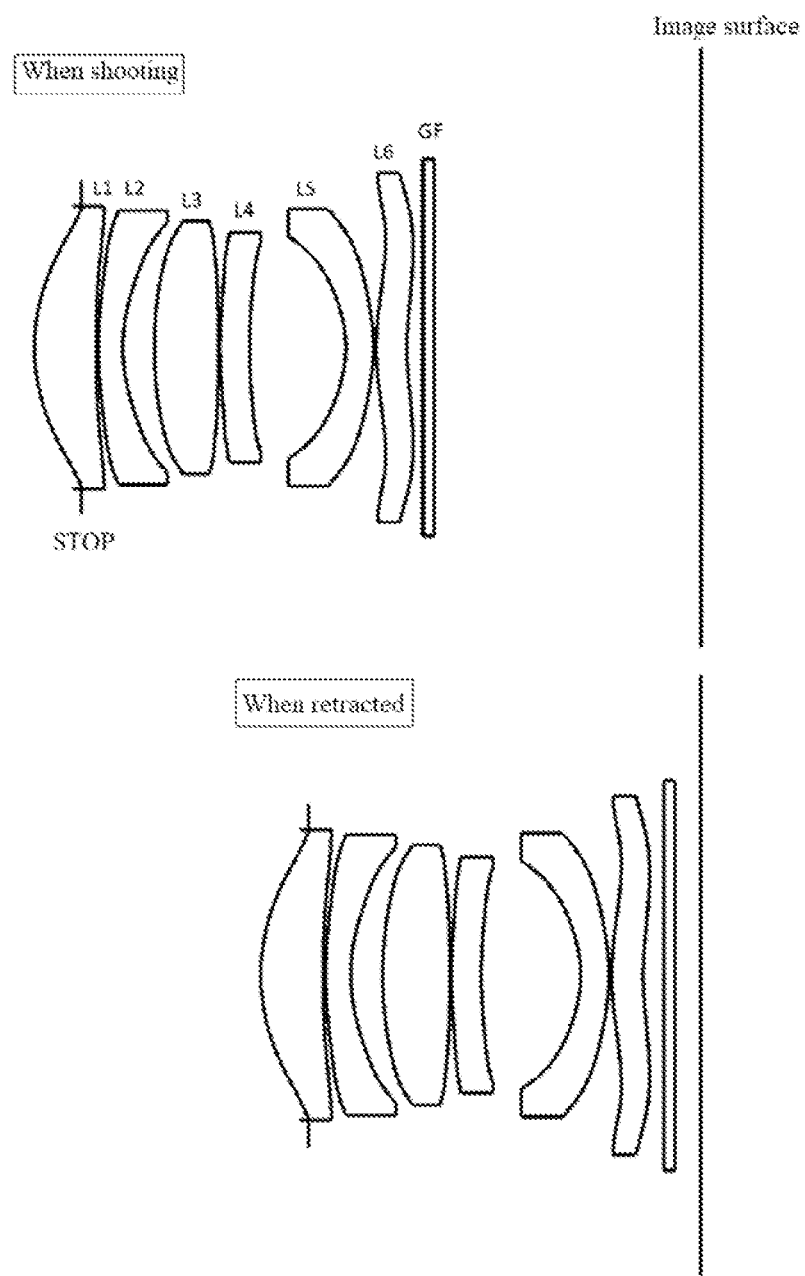
FIG. 5 is a diagram illustrating a schematic configuration of a camera lens LA of Embodiment 3 of the present invention.

FIG. 5 is a diagram illustrating a schematic configuration of a camera lens LA of Embodiment 3 of the present invention when shooting and when retracted. For each of the first lens L1 to the sixth lens L6 constituting the camera lens LA of Embodiment 3, the curvature radius R of the object side and the image side, the center thickness of the lens or the distance d between the lenses, the refractive index nd, and the Abbe number ν are as shown in Table 9; a value of A when shooting and a value of A when retracted are as shown in Table 10; a cone coefficient k and an aspheric coefficient are as shown in Table 11; and 2ω, Fno, f, f1, f2, f3, f4, f5, f6, TTL, and IH are as shown in Table 12.

TABLE 9

| | | R | d | | nd | | vd | Effective radium (mm) |
|---|---|---|---|---|---|---|---|---|
| STOP | | ∞ | d0= | −0.918 | | | | 2.716 |
| S1 | R1 | 3.61332 | d1= | 1.200 | nd1 | 1.5444 | v1 55.82 | 2.716 |
| S2 | R2 | 128.71517 | d2= | 0.050 | | | | 2.657 |
| S3 | R3 | 12.26442 | d3= | 0.474 | nd2 | 1.6153 | v2 25.94 | 2.626 |
| S4 | R4 | 3.32161 | d4= | 0.613 | | | | 2.409 |
| S5 | R5 | 8.70521 | d5= | 1.254 | nd3 | 1.5444 | v3 55.82 | 2.429 |
| S6 | R6 | −17.61580 | d6= | 0.030 | | | | 2.373 |
| S7 | R7 | 10.37950 | d7= | 0.565 | nd4 | 1.6153 | v4 25.94 | 2.208 |
| S8 | R8 | 8.09919 | d8= | 1.894 | | | | 2.007 |
| S9 | R9 | −2.17655 | d9= | 0.536 | nd5 | 1.5346 | v5 55.69 | 2.131 |
| S10 | R10 | −3.54016 | d10= | 0.050 | | | | 2.652 |
| S11 | R11 | 4.62541 | d11= | 0.602 | nd6 | 1.6449 | v6 22.54 | 3.179 |
| S12 | R12 | 5.56284 | d12= | 0.390 | | | | 3.347 |
| S13 | R13 | ∞ | d13= | 0.210 | ndg | 1.5168 | vg 64.17 | 3.586 |
| S14 | R14 | ∞ | d14= | A | | | | 3.640 |

Reference wavelength = 588 nm

TABLE 10

| | When shooting | When retracted |
|---|---|---|
| A | 5.111 | 0.500 |

TABLE 11

| | Cone coefficient | Aspheric coefficient | | | | |
|---|---|---|---|---|---|---|
| | k | A4 | A6 | A8 | A10 | A12 |
| S1 | 0.0000E+00 | −2.3119E−03 | 1.7289E−03 | −2.4684E−03 | 1.6105E−03 | −5.8060E−04 |
| S2 | 0.0000E+00 | 6.3492E−02 | −7.9790E−02 | 5.5385E−02 | −2.2923E−02 | 5.9060E−03 |
| S3 | 0.0000E+00 | 5.7465E−02 | −7.6752E−02 | 5.1683E−02 | −2.1146E−02 | 5.4689E−03 |
| S4 | 8.5403E−03 | 9.1419E−04 | −3.3555E−03 | −5.4271E−03 | 5.4198E−03 | −2.4276E−03 |
| S5 | 0.0000E+00 | 8.3932E−03 | 2.2930E−03 | −4.5811E−03 | 2.6403E−03 | −1.0318E−03 |
| S6 | 0.0000E+00 | 1.9710E−03 | 2.2578E−02 | −2.7947E−02 | 1.4761E−02 | −4.4135E−03 |
| S7 | 0.0000E+00 | −9.7342E−03 | 1.2342E−02 | −7.7754E−03 | −2.1883E−03 | 4.1405E−03 |
| S8 | 0.0000E+00 | −1.1655E−02 | −2.8063E−03 | 1.2741E−02 | −1.4097E−02 | 8.4838E−03 |

TABLE 11-continued

| | | | | | |
|---|---|---|---|---|---|
| S9 | 0.0000E+00 | 5.7201E-02 | -2.7457E-02 | 1.7746E-02 | -1.5742E-02 | 1.0939E-02 |
| S10 | 0.0000E+00 | 4.3733E-02 | -1.4538E-02 | -8.0595E-04 | 3.0516E-03 | -1.4204E-03 |
| S11 | 0.0000E+00 | -2.7501E-02 | 5.0636E-03 | -9.9409E-04 | 1.0371E-04 | 1.3978E-05 |
| S12 | 0.0000E+00 | -3.1645E-02 | 9.9107E-03 | -3.2084E-03 | 7.6541E-04 | -1.2399E-04 |

| | Cone coefficient | Aspheric coefficient | | | | |
|---|---|---|---|---|---|---|
| | k | A14 | A16 | A18 | A20 | / |
| S1 | 0.0000E+00 | 1.2233E-04 | -1.5192E-05 | 1.0289E-06 | -2.9186E-08 | / |
| S2 | 0.0000E+00 | -9.5509E-04 | 9.3941E-05 | -5.1141E-06 | 1.1765E-07 | / |
| S3 | 0.0000E+00 | -8.8833E-04 | 8.7080E-05 | -4.6555E-06 | 1.0253E-07 | / |
| S4 | 8.5403E-03 | 6.4848E-04 | -1.0335E-04 | 8.9942E-06 | -3.2953E-07 | / |
| S5 | 0.0000E+00 | 2.9190E-04 | -5.1859E-05 | 5.0403E-06 | -2.0581E-07 | / |
| S6 | 0.0000E+00 | 8.1599E-04 | -9.3377E-05 | 6.0331E-06 | -1.6587E-07 | / |
| S7 | 0.0000E+00 | -1.8385E-03 | 4.0215E-04 | -4.5168E-05 | 2.0892E-06 | / |
| S8 | 0.0000E+00 | -3.0068E-03 | 6.3369E-04 | -7.3982E-05 | 3.7033E-06 | / |
| S9 | 0.0000E+00 | -4.7120E-03 | 1.1968E-03 | -1.6504E-04 | 9.5650E-06 | / |
| S10 | 0.0000E+00 | 3.4649E-04 | -4.8907E-05 | 3.7656E-06 | -1.2196E-07 | / |
| S11 | 0.0000E+00 | -7.0901E-06 | 1.0503E-06 | -6.9332E-08 | 1.7266E-09 | / |
| S12 | 0.0000E+00 | 1.2999E-05 | -8.4489E-07 | 3.1451E-08 | -5.2400E-10 | / |

TABLE 12

| | |
|---|---|
| 2ω (°) | 45.28 |
| Fno | 2.43 |
| f (mm) | 13.202 |
| f1 (mm) | 6.806 |
| f2 (mm) | -7.556 |
| f3 (mm) | 10.885 |
| f4 (mm) | -66.160 |
| f5 (mm) | -12.248 |
| f6 (mm) | 34.005 |
| TTL when shooting (mm) | 12.980 |
| TTL when retracted (mm) | 8.369 |
| IH (mm) | 5.600 |
| TTL when shooting/IH | 2.318 |
| TTL when retracted/IH | 1.494 |

Embodiment 3 is as shown in Table 21, and satisfies the relational formulas (1) to (9).

Figure 6:
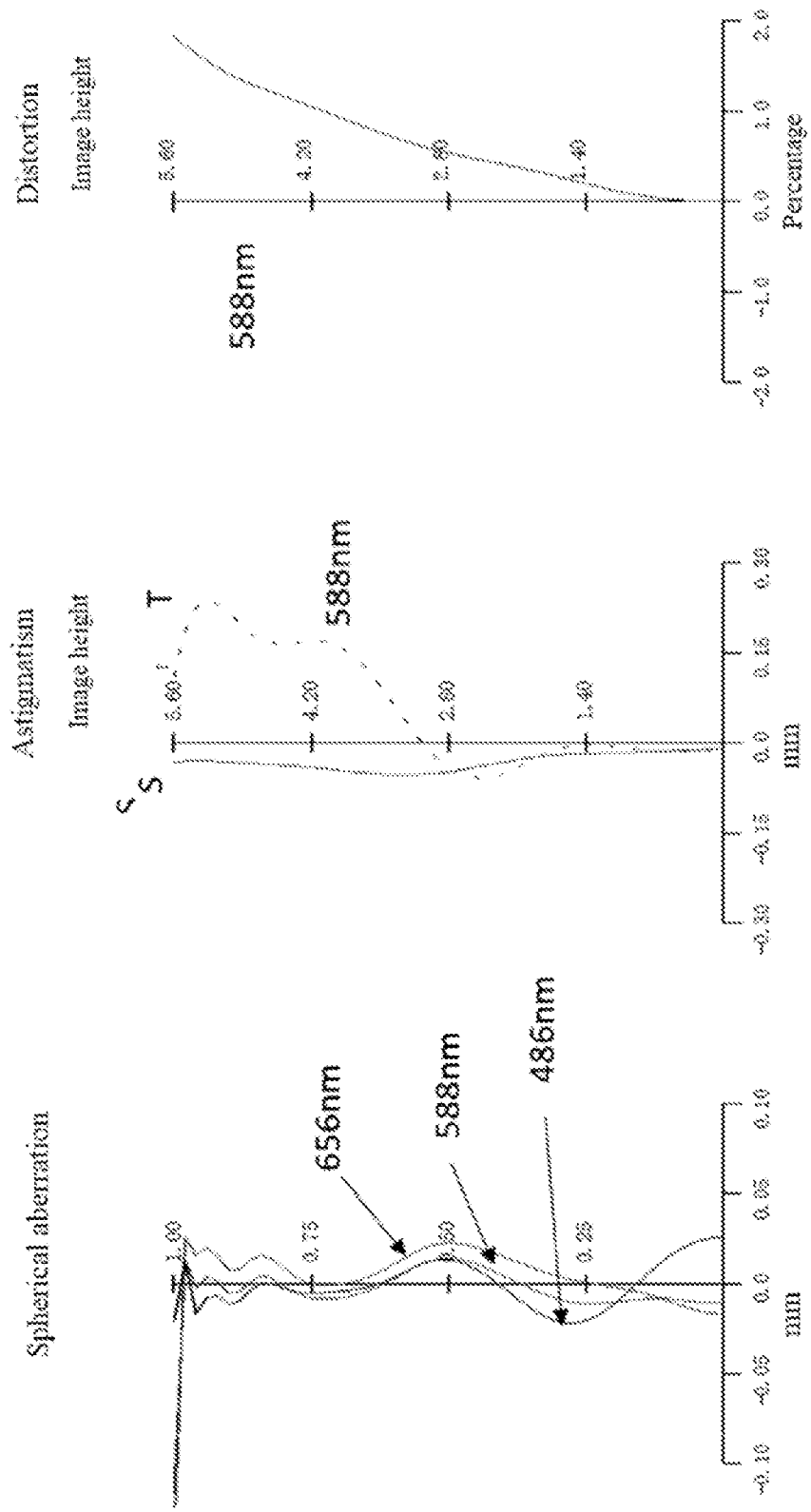
FIG. 6 is a diagram illustrating spherical aberration, astigmatism, and distortion of the camera lens LA of Embodiment 3 of the present invention.

The spherical aberration, astigmatism, and distortion of the camera lens LA of Embodiment 3 are as shown in FIG. 6. The camera lens LA of Embodiment 3 is as shown in FIG. 6, then it is known that 2ω=45.28°, and the camera lens has a low height with TTL/IH=1.494 when retracted, and has good optical characteristics.

Embodiment 4

Figure 7:
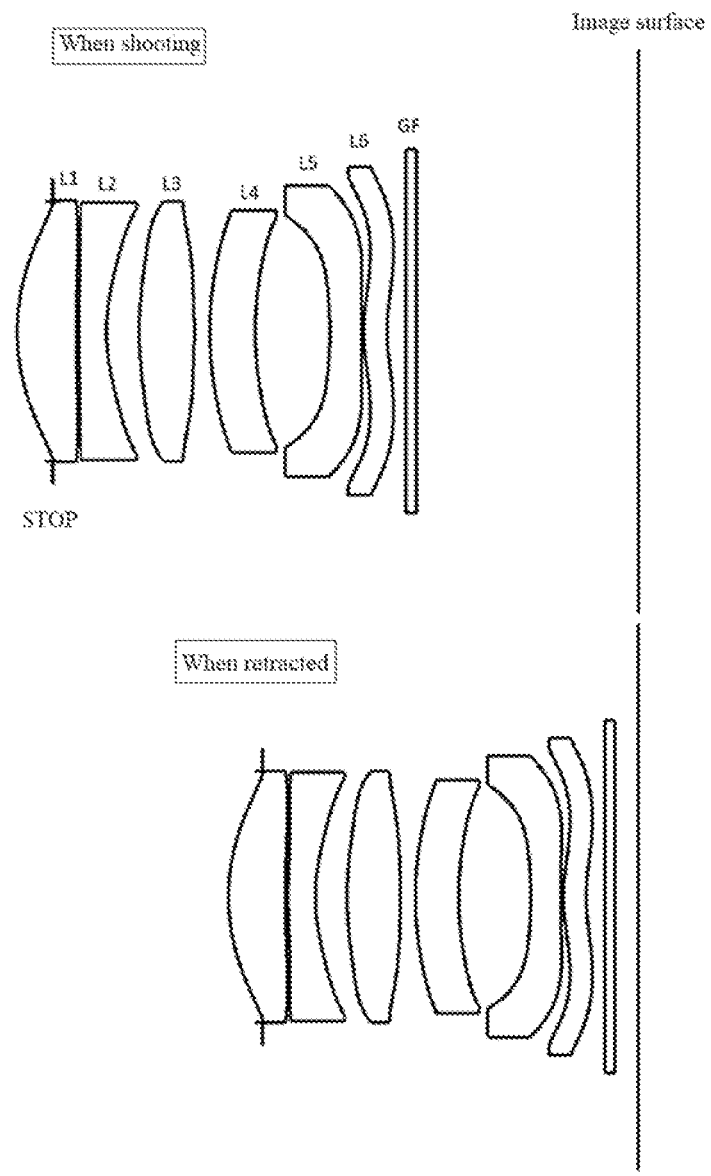
FIG. 7 is a diagram illustrating a schematic configuration of a camera lens LA of Embodiment 4 of the present invention.

FIG. 7 is a diagram illustrating a schematic configuration of a camera lens LA of Embodiment 4 of the present invention when shooting and when retracted. For each of the first lens L1 to the sixth lens L6 constituting the camera lens LA of Embodiment 4, the curvature radius R of the object side and the image side, the center thickness of the lens or the distance d between the lenses, the refractive index nd, and the Abbe number ν are as shown in Table 13; a value of A when shooting and a value of A when retracted are as shown in Table 14; a cone coefficient k and an aspheric coefficient are as shown in Table 15; and 2ω, Fno, f, f1, f2, f3, f4, f5, f6, TTL, and IH are as shown in Table 16.

TABLE 13

| | | R | d | | nd | | vd | Effective radium (mm) |
|---|---|---|---|---|---|---|---|---|
| STOP | | ∞ | d0= | -0.717 | | | | 2.599 |
| S1 | R1 | 4.08566 | d1= | 1.200 | nd1 | 1.5438 | ν1 | 56.03 | 2.603 |
| S2 | R2 | -237.54574 | d2= | 0.053 | | | | 2.583 |
| S3 | R3 | 34.46043 | d3= | 0.574 | nd2 | 1.6153 | ν2 | 25.94 | 2.572 |
| S4 | R4 | 4.01344 | d4= | 0.670 | | | | 2.492 |
| S5 | R5 | 9.33436 | d5= | 1.114 | nd3 | 1.5438 | ν3 | 56.03 | 2.594 |
| S6 | R6 | -11.09817 | d6= | 0.317 | | | | 2.538 |
| S7 | R7 | 8.20131 | d7= | 0.923 | nd4 | 1.6700 | ν4 | 19.39 | 2.409 |
| S8 | R8 | 6.90328 | d8= | 1.517 | | | | 2.263 |
| S9 | R9 | -6.80701 | d9= | 0.633 | nd5 | 1.5346 | ν5 | 55.69 | 2.317 |
| S10 | R10 | 207.86739 | d10= | 0.050 | | | | 2.905 |
| S11 | R11 | 3.29792 | d11= | 0.477 | nd6 | 1.6610 | ν6 | 20.53 | 3.097 |
| S12 | R12 | 3.46324 | d12= | 0.390 | | | | 3.277 |
| S13 | R13 | ∞ | d13= | 0.210 | ndg | 1.5168 | νg | 64.17 | 3.579 |
| S14 | R14 | ∞ | d14= | A | | | | 3.636 |

Reference wavelength = 588 nm

TABLE 14

| | When shooting | When retracted |
|---|---|---|
| A | 4.524 | 0.500 |

TABLE 15

| | Cone coefficient | Aspheric coefficient | | | | |
|---|---|---|---|---|---|---|
| | k | A4 | A6 | A8 | A10 | A12 |
| S1 | 0.0000E+00 | −1.2497E−03 | 1.5275E−03 | −2.4896E−03 | 1.6123E−03 | −5.8006E−04 |
| S2 | 0.0000E+00 | 6.0618E−02 | −7.9940E−02 | 5.5380E−02 | −2.2920E−02 | 5.9064E−03 |
| S3 | 0.0000E+00 | 5.8784E−02 | −8.8083E−02 | 6.2302E−02 | −2.6386E−02 | 7.0632E−03 |
| S4 | 0.0000E+00 | 1.1848E−02 | −2.8958E−02 | 1.9007E−02 | −8.1651E−03 | 2.4382E−03 |
| S5 | 0.0000E+00 | 1.8954E−02 | −1.3849E−02 | 3.9425E−03 | −9.4500E−04 | 3.0340E−04 |
| S6 | 0.0000E+00 | 4.0975E−02 | −3.2491E−02 | 1.1828E−02 | −2.4716E−03 | 3.0324E−04 |
| S7 | 0.0000E+00 | 3.0700E−02 | −2.4585E−02 | 8.8107E−03 | −1.3895E−03 | −2.5722E−05 |
| S8 | 0.0000E+00 | 8.0874E−03 | −7.8919E−03 | 2.5321E−03 | −2.5082E−04 | 4.1482E−06 |
| S9 | 0.0000E+00 | 3.3241E−02 | −3.1200E−02 | 1.1770E−02 | −3.5902E−03 | 8.2278E−04 |
| S10 | 0.0000E+00 | 1.5776E−02 | −7.4924E−03 | −9.9142E−04 | 9.3073E−04 | −2.1139E−04 |
| S11 | 0.0000E+00 | −7.6150E−02 | 2.8300E−02 | −9.9970E−03 | 2.3619E−03 | −3.5356E−04 |
| S12 | 0.0000E+00 | −6.9867E−02 | 2.2431E−02 | −6.7555E−03 | 1.4944E−03 | −2.3216E−04 |

| | Cone coefficient | Aspheric coefficient | | | | |
|---|---|---|---|---|---|---|
| | k | A14 | A16 | A18 | A20 | / |
| S1 | 0.0000E+00 | 1.2239E−04 | −1.5191E−05 | 1.0283E−06 | −2.9251E−08 | / |
| S2 | 0.0000E+00 | −9.5504E−04 | 9.3943E−05 | −5.1143E−06 | 1.1741E−07 | / |
| S3 | 0.0000E+00 | −1.2005E−03 | 1.2541E−04 | −7.3293E−06 | 1.8306E−07 | / |
| S4 | 0.0000E+00 | −4.8373E−04 | 6.0043E−05 | −4.2079E−06 | 1.2684E−07 | / |
| S5 | 0.0000E+00 | −7.3256E−05 | 1.0104E−05 | −7.1922E−07 | 2.0538E−08 | / |
| S6 | 0.0000E+00 | −1.5561E−05 | −1.3296E−06 | 2.7323E−07 | −1.3679E−08 | / |
| S7 | 0.0000E+00 | 5.4876E−05 | −1.1261E−05 | 1.1144E−06 | −4.6599E−08 | / |
| S8 | 0.0000E+00 | −1.2625E−05 | 5.1889E−06 | −7.6808E−07 | 4.3283E−08 | / |
| S9 | 0.0000E+00 | −1.2148E−04 | 8.7085E−06 | −1.9243E−08 | −2.1407E−08 | / |
| S10 | 0.0000E+00 | 2.3580E−05 | −1.3682E−06 | 3.9208E−08 | −5.1627E−10 | / |
| S11 | 0.0000E+00 | 3.2280E−05 | −1.7152E−06 | 4.9148E−08 | −6.4574E−10 | / |
| S12 | 0.0000E+00 | 2.4491E−05 | −1.6807E−06 | 6.8041E−08 | −1.2381E−09 | / |

TABLE 16

| | |
|---|---|
| 2ω (°) | 47.53 |
| Fno | 2.40 |
| f (mm) | 12.477 |
| f1 (mm) | 7.399 |
| f2 (mm) | −7.436 |
| f3 (mm) | 9.506 |
| f4 (mm) | −91.084 |
| f5 (mm) | −12.317 |
| f6 (mm) | 48.630 |
| TTL when shooting (mm) | 12.652 |
| TTL when retracted (mm) | 8.628 |
| IH (mm) | 5.600 |
| TTL when shooting/IH | 2.259 |
| TTL when retracted/IH | 1.541 |

Embodiment 4 is as shown in Table 21, and satisfies the relational formulas (1) to (9).

Figure 8:
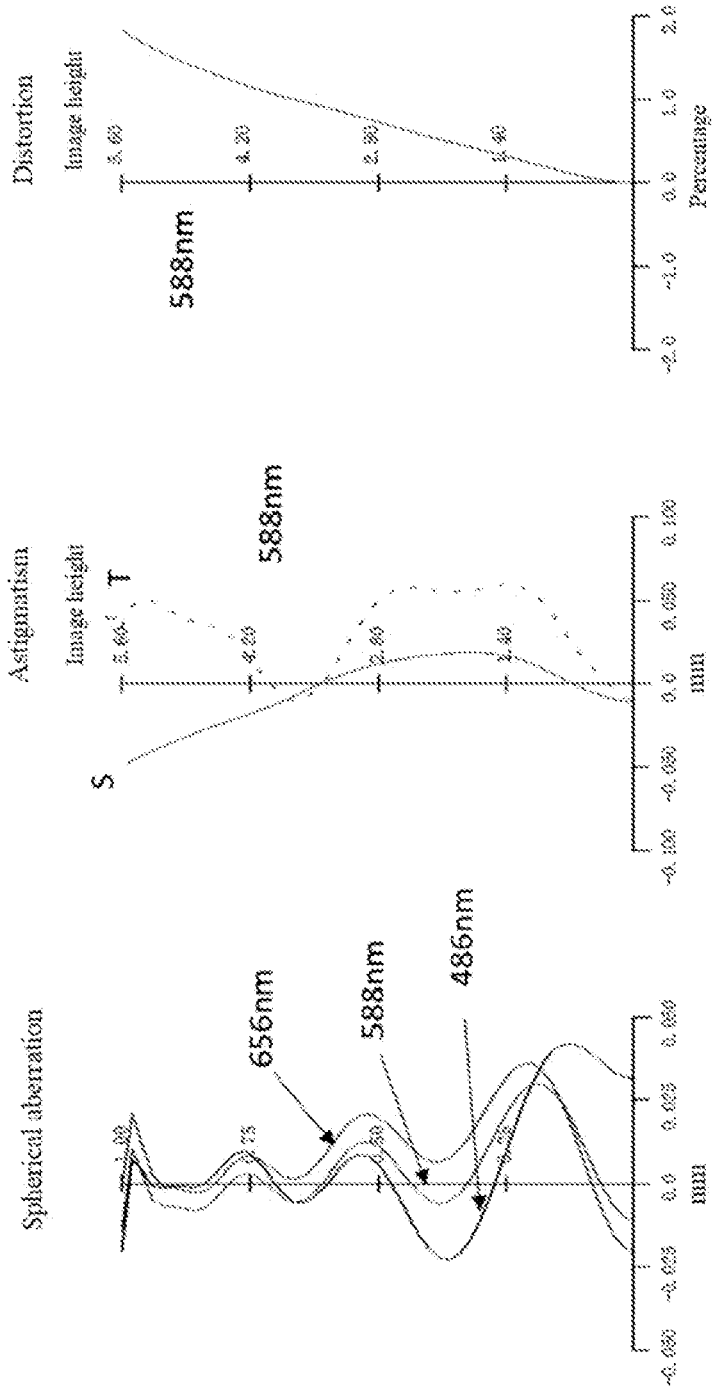
FIG. 8 is a diagram illustrating spherical aberration, astigmatism, and distortion of the camera lens LA of Embodiment 4 of the present invention.

The spherical aberration, astigmatism, and distortion of the camera lens LA of Embodiment 4 are as shown in FIG. 8. The camera lens LA of Embodiment 4 is as shown in FIG. 8, then it is known that 2ω=47.53°, and the camera lens has a low height with TTL/IH=1.541 when retracted, and has good optical characteristics.

Embodiment 5

Figure 9:
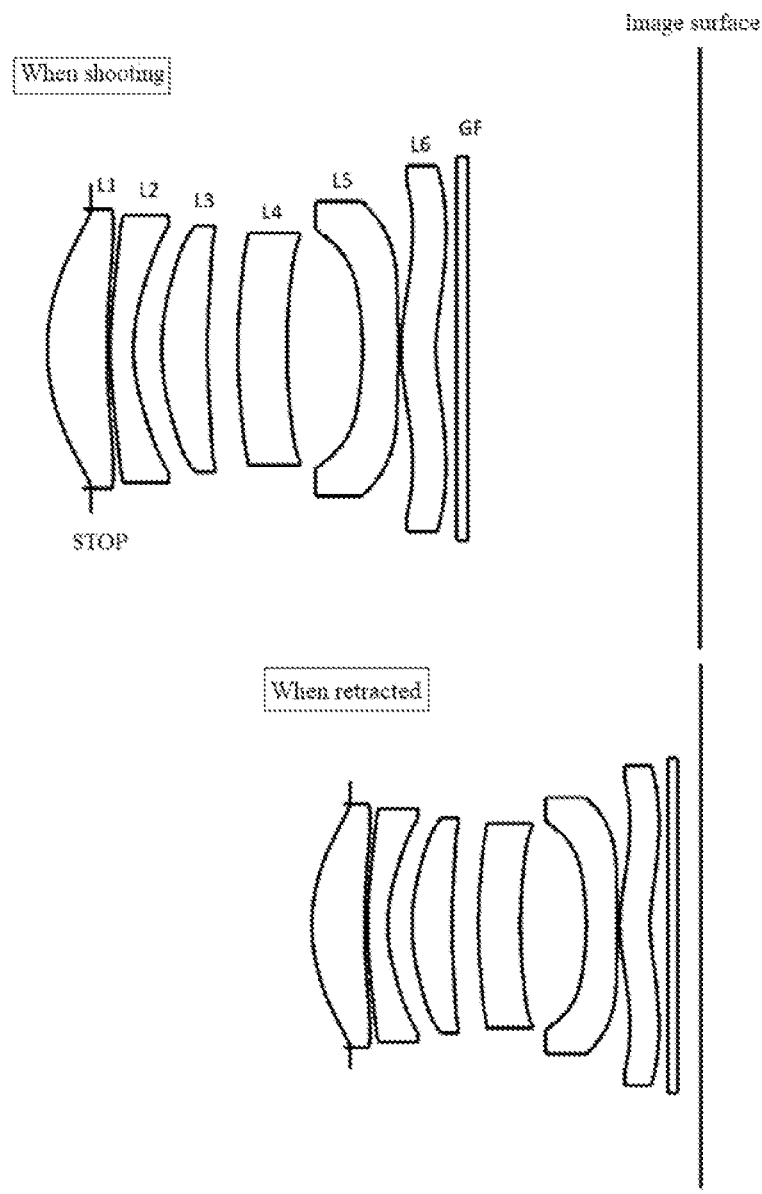
FIG. 9 is a diagram illustrating a schematic configuration of a camera lens LA of Embodiment 5 of the present invention.

FIG. 9 is a diagram illustrating a schematic configuration of a camera lens LA of Embodiment 5 of the present invention when shooting and when retracted. For each of the first lens L1 to the sixth lens L6 constituting the camera lens LA of Embodiment 5, the curvature radius R the object side and the image side, the center thickness of the lens or the distance d between the lenses, the refractive index nd, and the Abbe number ν are as shown in Table 17; a value of A when shooting and a value of A when retracted are as shown in Table 18; a cone coefficient k and an aspheric coefficient are as shown in Table 19; and 2ω, Fno, f, f1, f2, f3, f4, f5, f6, TTL, and IH are as shown in Table 20.

TABLE 17

| | R | | d | | nd | | vd | Effective radium (mm) |
|---|---|---|---|---|---|---|---|---|
| STOP | | ∞ | d0= | −0.828 | | | | 2.599 |
| S1 | R1 | 3.71815 | d1= | 1.147 | nd1 | 1.5266 | v1 76.49 | 2.599 |
| S2 | R2 | 29.47395 | d2= | 0.064 | | | | 2.543 |
| S3 | R3 | 11.81773 | d3= | 0.440 | nd2 | 1.5532 | v2 42.92 | 2.490 |
| S4 | R4 | 3.46196 | d4= | 0.537 | | | | 2.287 |
| S5 | R5 | 5.07886 | d5= | 0.867 | nd3 | 1.5895 | v3 31.53 | 2.297 |
| S6 | R6 | 29.25045 | d6= | 0.576 | | | | 2.247 |
| S7 | R7 | 13.84292 | d7= | 0.928 | nd4 | 1.6713 | v4 19.24 | 2.171 |
| S8 | R8 | 11.63934 | d8= | 1.435 | | | | 2.131 |
| S9 | R9 | −4.77507 | d9= | 0.680 | nd5 | 1.5945 | v5 30.21 | 2.228 |
| S10 | R10 | −13.47461 | d10= | 0.050 | | | | 2.738 |
| S11 | R11 | 3.43244 | d11= | 0.662 | nd6 | 1.5717 | v6 37.63 | 3.124 |
| S12 | R12 | 3.67026 | d12= | 0.390 | | | | 3.413 |

TABLE 17-continued

| | R | d | | nd | | vd | Effective radium (mm) |
|---|---|---|---|---|---|---|---|
| S13 | R13 | ∞ | d13= 0.210 | ndg | 1.5168 | vg 64.17 | 3.514 |
| S14 | R14 | ∞ | d14= A | | | | 3.574 |

Reference wavelength = 588 nm

TABLE 18

| | When shooting | When retracted |
|---|---|---|
| A | 4.427 | 0.500 |

TABLE 19

| | Cone coefficient | Aspheric coefficient | | | | |
|---|---|---|---|---|---|---|
| | k | A4 | A6 | A8 | A10 | A12 |
| S1 | 0.0000E+00 | −1.0682E−03 | 1.4607E−03 | −2.4986E−03 | 1.6129E−03 | −5.7976E−04 |
| S2 | 0.0000E+00 | 6.1390E−02 | −8.0030E−02 | 5.5358E−02 | −2.2922E−02 | 5.9067E−03 |
| S3 | 0.0000E+00 | 6.3906E−02 | −9.3993E−02 | 6.5796E−02 | −2.7344E−02 | 7.1150E−03 |
| S4 | 0.0000E+00 | 1.8794E−02 | −3.3964E−02 | 1.7664E−02 | −4.4546E−03 | 1.3666E−04 |
| S5 | 0.0000E+00 | 2.3711E−02 | −1.1639E−02 | −1.8922E−03 | 3.6549E−03 | −1.7959E−03 |
| S6 | 0.0000E+00 | 2.5832E−02 | −1.2064E−02 | −2.7218E−03 | 4.1472E−03 | −1.8459E−03 |
| S7 | 0.0000E+00 | 1.5177E−02 | −9.4782E−03 | −8.5264E−04 | 3.1573E−03 | −1.7929E−03 |
| S8 | 0.0000E+00 | 1.0451E−02 | −1.1910E−02 | 8.2882E−03 | −5.6033E−03 | 3.0207E−03 |
| S9 | 0.0000E+00 | 4.4785E−02 | −2.7820E−02 | 3.0395E−03 | 3.2331E−03 | −2.4144E−03 |
| S10 | 0.0000E+00 | 2.4137E−02 | −5.1809E−03 | −3.9879E−03 | 2.0985E−03 | −4.9138E−04 |
| S11 | 0.0000E+00 | −6.0523E−02 | 2.4367E−02 | −8.9466E−03 | 2.1650E−03 | −3.3215E−04 |
| S12 | 0.0000E+00 | −5.5601E−02 | 1.7815E−02 | −5.0046E−03 | 9.9827E−04 | −1.3614E−04 |

| | Cone coefficient | Aspheric coefficient | | | | |
|---|---|---|---|---|---|---|
| | k | A14 | A16 | A18 | A20 | / |
| S1 | 0.0000E+00 | 1.2239E−04 | −1.5196E−05 | 1.0277E−06 | −2.9224E−08 | / |
| S2 | 0.0000E+00 | −9.5501E−04 | 9.3943E−05 | −5.1137E−06 | 1.1723E−07 | / |
| S3 | 0.0000E+00 | −1.1636E−03 | 1.1529E−04 | −6.2482E−06 | 1.3939E−07 | / |
| S4 | 0.0000E+00 | 2.5307E−04 | −7.3291E−05 | 8.7444E−06 | −3.9856E−07 | / |
| S5 | 0.0000E+00 | 5.2294E−04 | −9.2235E−05 | 8.9713E−06 | −3.6836E−07 | / |
| S6 | 0.0000E+00 | 4.9748E−04 | −8.3961E−05 | 7.9995E−06 | −3.2723E−07 | / |
| S7 | 0.0000E+00 | 6.0738E−04 | −1.2894E−04 | 1.5405E−05 | −7.8705E−07 | / |
| S8 | 0.0000E+00 | −1.0467E−03 | 2.1970E−04 | −2.5600E−05 | 1.2733E−06 | / |
| S9 | 0.0000E+00 | 8.1513E−04 | −1.4683E−04 | 1.2960E−05 | −3.9940E−07 | / |
| S10 | 0.0000E+00 | 7.1960E−05 | −7.2355E−06 | 4.6275E−07 | −1.3609E−08 | / |
| S11 | 0.0000E+00 | 3.1911E−05 | −1.8832E−06 | 6.4094E−08 | −1.0094E−09 | / |
| S12 | 0.0000E+00 | 1.2399E−05 | −7.3202E−07 | 2.5754E−08 | −4.1582E−10 | / |

TABLE 20

| | |
|---|---|
| 2ω (°) | 47.56 |
| Fno | 2.40 |
| f (mm) | 12.476 |
| f1 (mm) | 7.703 |
| f2 (mm) | −8.121 |
| f3 (mm) | 11.161 |
| f4 (mm) | −131.312 |
| f5 (mm) | −14.222 |
| f6 (mm) | 38.007 |
| TTL when shooting (mm) | 12.413 |
| TTL when retracted (mm) | 8.486 |
| IH (mm) | 5.600 |
| TTL when shooting/IH | 2.217 |
| TTL when retracted/IH | 1.515 |

Embodiment 5 is as shown in Table 21, and satisfies the relational formulas (1) to (9).

Figure 10:
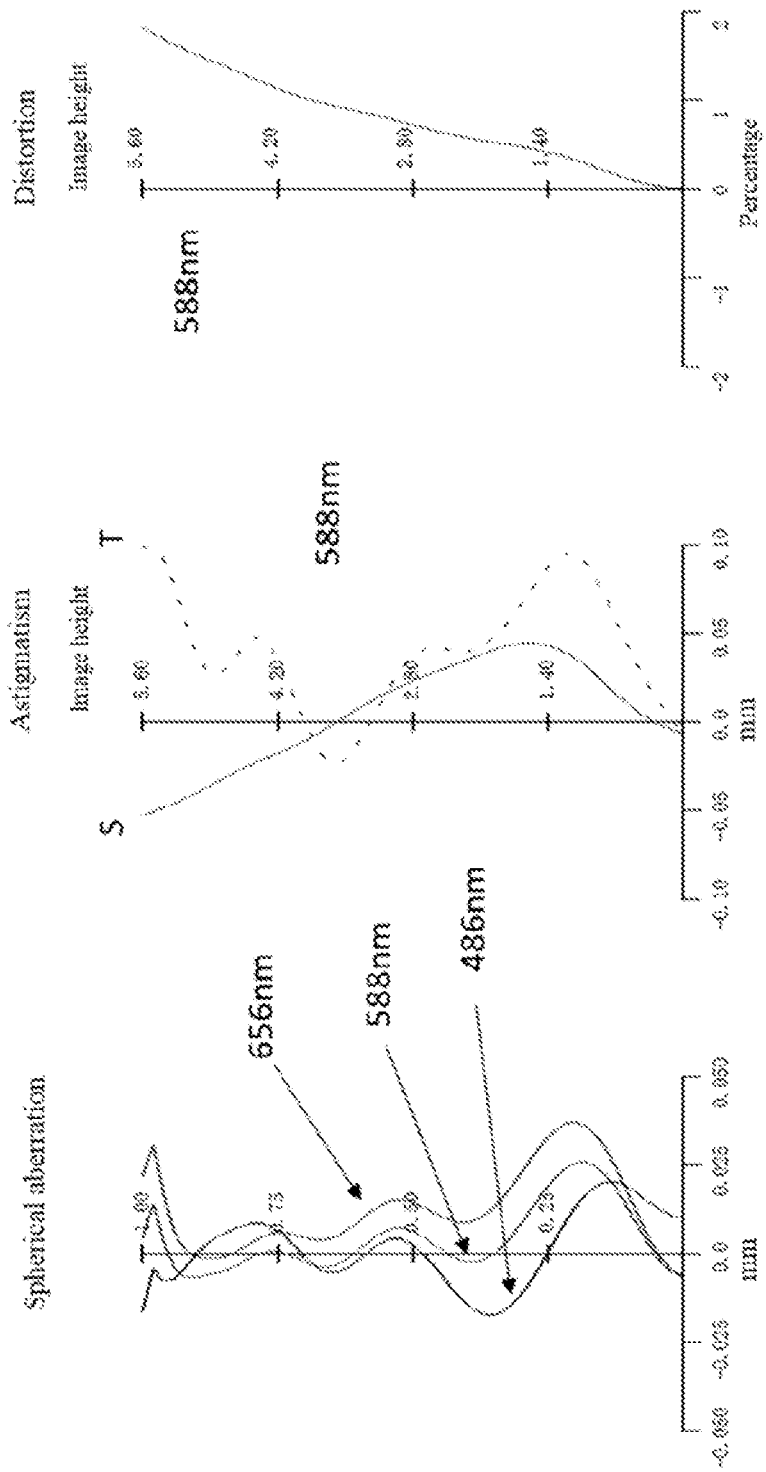
FIG. 10 is a diagram illustrating spherical aberration, astigmatism, and distortion of the camera lens LA of Embodiment 5 of the present invention.

The spherical aberration, astigmatism, and distortion of the camera lens LA of Embodiment 5 are as shown in FIG. 10. The camera lens LA of Embodiment 5 is as shown in FIG. 10, then it is known that 2ω=47.56°, and the camera lens has a low height with TTL/IH=1.515 when retracted, and has good optical characteristics.

Table 21 shows the values corresponding to the parameters defined by the relational formulas (1) to (9) of Embodiment 1 to Embodiment 5.

TABLE 21

| | Embodiment 1 | Embodiment 2 | Embodiment 3 | Embodiment 4 | Embodiment 5 | Notes |
|---|---|---|---|---|---|---|
| DL/TTL when shooting | 0.595 | 0.560 | 0.560 | 0.596 | 0.595 | Formula (1) |
| f1/f2 | −0.990 | −0.805 | −0.901 | −0.995 | −0.949 | Formula (2) |
| R9/f | −0.428 | −0.181 | −0.165 | −0.546 | −0.383 | Formula (3) |
| d1/f | 0.083 | 0.075 | 0.091 | 0.096 | 0.092 | Formula (4) |
| d8/f | 0.115 | 0.115 | 0.143 | 0.122 | 0.115 | Formula (5) |
| f1/f | 0.689 | 0.795 | 0.516 | 0.593 | 0.617 | Formula (6) |
| f2/f | −0.696 | −0.988 | −0.572 | −0.596 | −0.651 | Formula (7) |
| f3/f | 0.595 | 0.684 | 0.824 | 0.762 | 0.895 | Formula (8) |
| d5/f | 0.095 | 0.095 | 0.095 | 0.089 | 0.070 | Formula (9) |

What is claimed is:

1. A camera lens, comprising, from an object side:
a first lens having a positive refractive power;
a second lens having a negative refractive power;
a third lens having a positive refractive power;
a fourth lens having a negative refractive power;
a fifth lens having a negative refractive power; and
a sixth lens having a positive refractive power,
wherein the camera lens satisfies relational formulas (1) to (6):

$$DL/TTL \text{ when shooting} \leq 0.60 \tag{1}$$

$$-1.00 \leq f1/f2 \leq -0.80 \tag{2}$$

$$-0.55 \leq R9/f \leq -0.15 \tag{3}$$

$$0.07 \leq d1/f \leq 0.11 \tag{4}$$

$$0.11 \leq d8/f \leq 0.15 \tag{5}$$

$$0.50 \leq f1/f \leq 0.80 \tag{6}$$

where
DL represents an on-axis distance from an object side surface of the first lens to an image side surface of the sixth lens,
TTL when shooting represents a total length of the camera lens when shooting, i.e., an on-axis distance from the object side surface of the first lens to an image surface,
f represents a focal length of the camera lens,
f1 represents a focal length of the first lens,
f2 represents a focal length of the second lens,
R9 represents a curvature radius of an object side surface of the fifth lens,
d1 represents a center thickness of the first lens; and
d8 represents an on-axis distance from an image side surface of the fourth lens to the object side surface of the fifth lens.

2. The camera lens as described in claim 1, wherein the camera lens further satisfies a relational formula (7):

$$-1.00 \leq f2/f \leq -0.50 \tag{7}$$

3. The camera lens as described in claim 1, wherein the camera lens further satisfies a relational formula (8):

$$0.59 \leq f3/f \leq 0.90 \tag{8}$$

where f3 represents a focal length of the third lens.

4. The camera lens as described in claim 1, wherein the camera lens further satisfies a relational formula (9):

$$0.06 \leq d5/f \leq 0.10 \tag{9}$$

where d5 represents a center thickness of the third lens.

* * * * *